United States Patent
Madden et al.

(10) Patent No.: US 12,197,410 B2
(45) Date of Patent: Jan. 14, 2025

(54) COMPUTERIZED SYSTEM AND METHOD FOR ELECTRONICALLY GENERATING A DYNAMICALLY VISUALIZED HIERARCHICAL REPRESENTATION OF ELECTRONIC INFORMATION

(71) Applicant: AVEVA Software, LLC, Lake Forest, CA (US)

(72) Inventors: John Jerome Madden, Friendswood, TX (US); Douglas Paul Kane, Vashon, WA (US)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 17/872,395

(22) Filed: Jul. 25, 2022

(65) Prior Publication Data
US 2023/0077605 A1   Mar. 16, 2023

Related U.S. Application Data

(63) Continuation of application No. 17/095,113, filed on Nov. 11, 2020, now abandoned.
(Continued)

(51) Int. Cl.
*G06F 16/22* (2019.01)
*G06F 3/0482* (2013.01)
(Continued)

(52) U.S. Cl.
CPC ........ *G06F 16/2246* (2019.01); *G06F 3/0484* (2013.01); *G06F 9/451* (2018.02); *G06F 16/26* (2019.01); *G06F 3/0482* (2013.01)

(58) Field of Classification Search
CPC ...... G06F 16/2246; G06F 9/451; G06F 16/26; G06F 3/0484; G06F 3/0482
See application file for complete search history.

(56) References Cited

U.S. PATENT DOCUMENTS

| | | |
|---|---|---|
| 8,010,909 B1 | 8/2011 | Hanson et al. |
| 9,007,302 B1 | 4/2015 | Bandt-Horn |

(Continued)

OTHER PUBLICATIONS

Ahu Sieg, Bamshad Mobasher, and Robin Burke. 2007. Web search personalization with ontological user profiles. In Proceedings of the sixteenth ACM conference on Conference on information and knowledge management (CIKM '07). Association for Computing Machinery, New York, NY, USA, 525-534. (Year: 2007).*

(Continued)

*Primary Examiner* — James T Tsai
(74) *Attorney, Agent, or Firm* — Dergosits & Noah LLP; Todd A. Noah

(57) ABSTRACT

Disclosed are systems and methods for improving interactions with and between computers in content providing, displaying and/or hosting systems supported by or configured with devices, servers and/or platforms. The disclosed systems and methods provide a novel framework that enables multiple, alternate hierarchies to be organized, restructured and/or created based on the same set of assets, with each of the hierarchies being ontologically different and catering to wide variety of relationships that can exist between assets. The framework configures and displays a hierarchical representation of assets, along with various properties of each asset, within a dynamically generated and displayed interface. The framework's visualization and analysis can be modified in response to a request, where dependent on the type of request or type of action included in the request, a restructuring of a hierarchy or new generation of a hierarchy can be realized and displayed.

18 Claims, 7 Drawing Sheets

Related U.S. Application Data

(60) Provisional application No. 62/933,826, filed on Nov. 11, 2019.

(51) Int. Cl.
*G06F 3/0484* (2022.01)
*G06F 9/451* (2018.01)
*G06F 16/26* (2019.01)

(56) References Cited

U.S. PATENT DOCUMENTS

| | | | |
|---|---|---|---|
| 9,424,333 B1 | 8/2016 | Bisignani et al. | |
| 10,452,714 B2 | 10/2019 | Hart et al. | |
| 2004/0172460 A1* | 9/2004 | Marel | G06F 16/9535 |
| | | | 709/217 |
| 2006/0026509 A1 | 2/2006 | Porter | |
| 2008/0077512 A1 | 3/2008 | Grewal | |
| 2008/0098484 A1 | 4/2008 | Cicchitto et al. | |
| 2011/0078201 A1* | 3/2011 | Ryan | G06F 16/26 |
| | | | 707/805 |
| 2012/0313965 A1* | 12/2012 | Mochizuki | G06F 16/58 |
| | | | 345/619 |
| 2013/0097545 A1 | 4/2013 | Grewal | |
| 2014/0214801 A1 | 7/2014 | Cilliberti, III | |
| 2015/0026159 A1* | 1/2015 | Berkman | G06F 16/9535 |
| | | | 707/722 |
| 2015/0134670 A1 | 5/2015 | Liu et al. | |
| 2016/0132551 A1 | 5/2016 | Trinon et al. | |
| 2016/0328139 A1 | 11/2016 | Bear et al. | |
| 2017/0236089 A1 | 8/2017 | Hilemon et al. | |
| 2017/0308278 A1 | 10/2017 | Coble et al. | |
| 2019/0197080 A1* | 6/2019 | Bondareva | H04L 67/10 |
| 2020/0201848 A1* | 6/2020 | Srinivasan | G06F 16/2246 |

OTHER PUBLICATIONS

International Search Report and Written Opinion for corresponding PCT International Application No. PCT/US2020/059990 dated Feb. 26, 2021, 9 pages.
Zenduit, Step 1: Build Your Asset Hierarchy, <U RL=https://support.zenduit.com/portal/en/kb/articles/step-1-build-your-asset-hierarchy>, last accessed, Sep. 2021 (Year: 2017).

\* cited by examiner

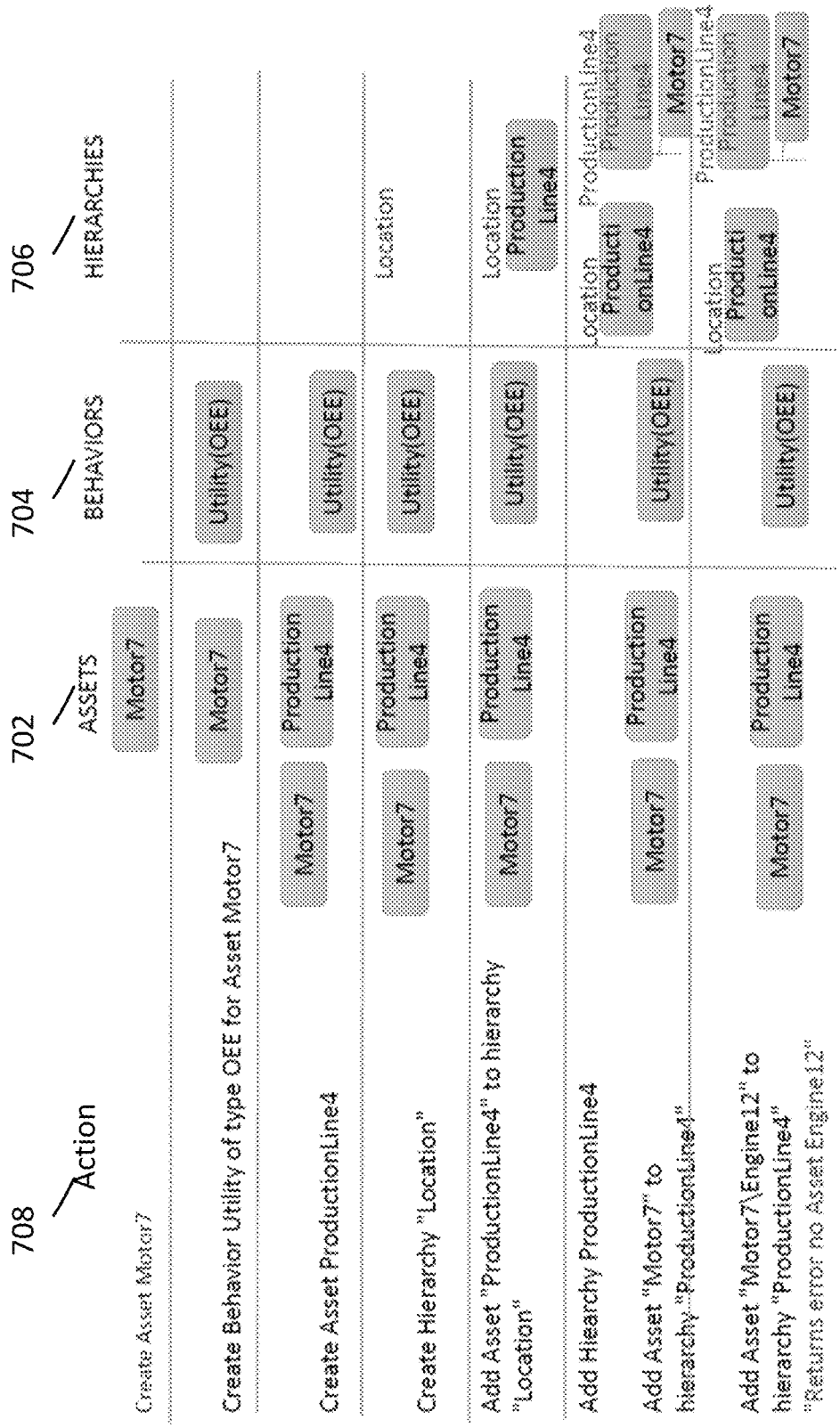

COMPUTERIZED SYSTEM AND METHOD FOR ELECTRONICALLY GENERATING A DYNAMICALLY VISUALIZED HIERARCHICAL REPRESENTATION OF ELECTRONIC INFORMATION

CROSS-REFERENCE TO RELATED APPLICATIONS

This application is a Continuation application of U.S. patent application Ser. No. 17/095,113, filed on Nov. 11, 2020, which claims the benefit of priority from U.S. Provisional Application No. 62/933,826, filed Nov. 11, 2019, entitled "Hierarchical Representation Of Assets, Enabling Alternate Visualization And Analysis Of Assets System And Server," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content displaying, hosting and providing devices, systems and/or platforms by modifying the capabilities and providing non-native functionality to such devices, systems and/or platforms through a novel and improved asset management and visualization framework for dynamically generating and displaying an electronic hierarchy of physical asset data associated with physical and computerized operations.

BACKGROUND

Conventional databases and storage utilities, such as those used in an industrial environment, are typically structured and organized according to a traditional hierarchy that depends on a parent and child relationship between related data. This traditional approach leverages this known organizational facility in order to enact automation and distribute resources. For example, identification of a parent asset can enable the automation of its progeny. In another example, when power is applied to a parent, power can be distributed to its children as well based on the structure of how the parent/child data is stored and allocated within the storage.

SUMMARY

The disclosed systems and methods provide advanced mechanisms that improve how resources can be allocated. Rather than being tied to the rigid or static relationships of a parent and child, as in conventional systems, the disclosed systems and methods enable multiple, alternate hierarchies to organize the same set of assets, with each of the hierarchies being ontologically different and catering to wide variety of relationships that can exist between assets.

In some embodiments, a hierarchical representation of assets, along with various properties of each asset, can be uploaded into the multiple, alternate hierarchical representation of assets, enabling alternate visualization and analysis of assets. In some embodiments, users can search for higher level assets, rather than individual properties of assets. In some embodiments, users can visualize the available alarms for each matching asset.

In some embodiments, visualization can comprise an automatic grouping of alarms of an asset, based on useful attributes of assets. In some embodiments, automatic grouping of alarms can allow for quick and easy visualization of alarms. In some embodiments, grouping alarms can be correlated to individual alarms based on automatically assigned markers. In some embodiments, correlation between groups and individual alarm instances can be based on one to one and/or one to many mappings of attribute values. In some embodiments, correlation between groups and individual alarm instances can be an effective summarization of alarms, yet unambiguous identification of individual alarm instances.

In some embodiments, analysis of alarms can be performed through filtering groups both single and multiple. In some embodiments, filtering groups can automatically provide a view of multiple alarm groups, while providing detailed alarm records of a set of selected one or more groups, enabling effective alarm analysis.

In some embodiments, being able to model multiple hierarchies on a given set of assets can avoid creating duplicate assets. In some embodiments, details contained within each hierarchy can save engineering time both in building a system and maintaining it. In some embodiments, being able to model multiple hierarchies for a given set of assets can allow for easy maintenance of asset information in a centralized fashion, and can save engineering time and enhance computational and system performance by reducing errors when assets are updated, modified, or deleted.

In some embodiments, multiple hierarchies can allow for a simplified implementation of asset systems, as more granular hierarchies can be created for specific purposes, instead of larger hierarchies, thus saving engineering time and resource allocation through simplification, thereby leading to more efficient, agile and accurate computations of operations.

In some embodiments, multiple hierarchies can enable advanced analytics scenarios. Some embodiments include being able to structure a given set of assets in multiple hierarchies, without duplicating assets, while maintaining a centralized list of assets.

Some embodiments allow an application to be flexible in picking one or more hierarchies that suit it needs, rather than a single system of hierarchy as is common in the prior art. For example, an application, the device operating the application or the platform being leveraged to executed and/or host the application can request a hierarchy be reorganized, restructured or even created according to its computing capabilities (e.g., hardware, software and display capabilities).

According to some embodiments, the storage, hierarchical organization, structuring and restructuring can be implemented within any known or to be known type of form of database, index or storage, including, but not limited to, look-up tables (LUT), blockchains, unordered, ordered, heap files, hashes, tree structures, object-oriented, column or row orientated, graph, NoSQL, NewSQL, cloud and the like.

According to some embodiments, a computer-implemented method is disclosed that enables multiple, alternate hierarchies to be organized, restructured and/or created based on the same set of assets, with each of the hierarchies being ontologically different and catering to wide variety of relationships that can exist between assets.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework that enables multiple, alternate hierarchies to be organized, restructured and/or created based on the same set of assets, with each of the hierarchies being ontologically different and catering to wide variety of relationships that can exist between assets.

In accordance with some embodiments, a system is provided that comprises one or more computing devices configured to provide functionality in accordance with such embodiments. In accordance with some embodiments, functionality is embodied in steps of a method performed by at least one computing device. In accordance with some embodiments, program code (or program logic) executed by a processor(s) of a computing device to implement functionality in accordance with one or more such embodiments is embodied in, by and/or on a non-transitory computer-readable medium.

According to some embodiments, a computing device is disclosed which comprises: one or more processors; and a non-transitory computer-readable memory having stored therein computer-executable instructions, that when executed by the one or more processors, cause the one or more processors to perform actions comprising: receiving asset information related to a set of physical assets, the asset information comprising data corresponding operation of the set of physical assets at a set of locations; storing the asset information within a data store, the storage comprising structuring and storing the asset information according to a defined hierarchy; receiving a request to display a version of the defined hierarchy, the request comprising data corresponding to at least a portion of the set of physical assets; analyzing the defined hierarchy based on the request, and based on the analysis, identifying asset information corresponding to the portion of physical assets; determining, based on the request, an electronic mapping of a path between asset information of the portion of physical assets, the electronic mapping comprising a modification of the structuring of the defined hierarchy; generating a user interface (UI) display page, the UI display page comprising a digital representation of the electronic mapping; and causing, over a network, the UI to be displayed on a display of a user device.

In some embodiments, the actions further comprise: analyzing the received asset information; and determining, based on the analysis, a structure of the asset information, the structure comprising information indicating a relationship between each of the physical assets, wherein the defined hierarchy is based on the relationship information.

In some embodiments, the received asset information comprises information indicating the defined hierarchy. In some embodiments, the actions further comprise: analyzing the received asset information, the analysis comprising parsing the asset information and identifying the defined hierarchy information; and extracting the defined hierarchy information, wherein the storing is based on the extraction.

In some embodiments, the request comprises an action selected from a group consisting of: restructuring the defined hierarchy, creating a new hierarchy, and viewing the defined hierarchy. In some embodiments, the version is based on the action.

In some embodiments, the request comprises information selected from a group consisting of: alarm information, anomaly information, a time, location, type of asset, type of user, type of operation, context, application capabilities and device capabilities.

In some embodiments, the path associated with the determined mapping is a created new path within the data store.

In some embodiments, the path associated with the determined mapping is a modified path of asset information within the data store.

In some embodiments, the request is received from the user device.

In some embodiments, the UI comprises functionality for controlling operation of the physical assets digitally represented by the displayed electronic mapping, the control configured according to the path.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 7 illustrates non-limiting example embodiments according to some embodiments of the present disclosure.

DESCRIPTION OF EMBODIMENTS

Figure 1:
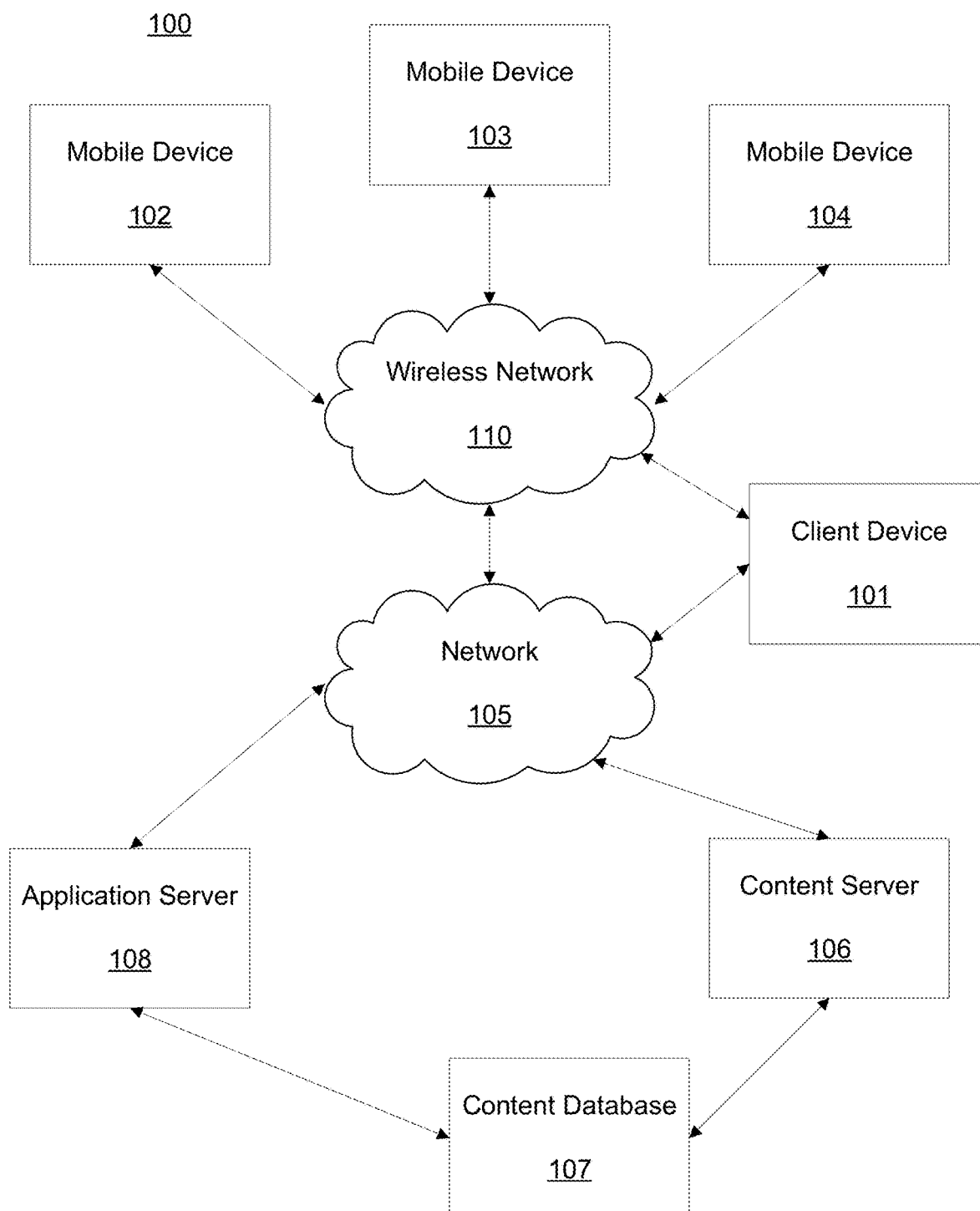
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
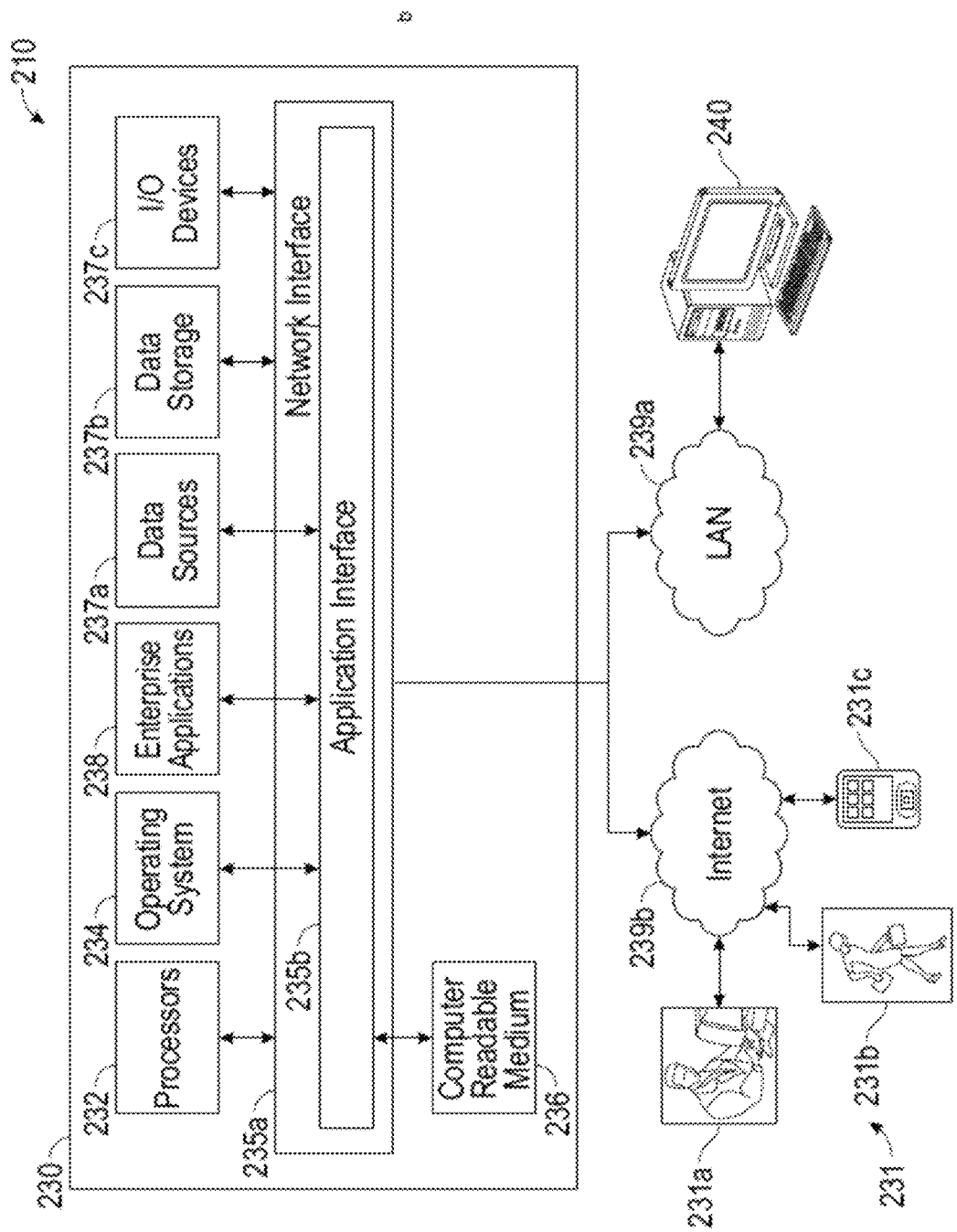
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
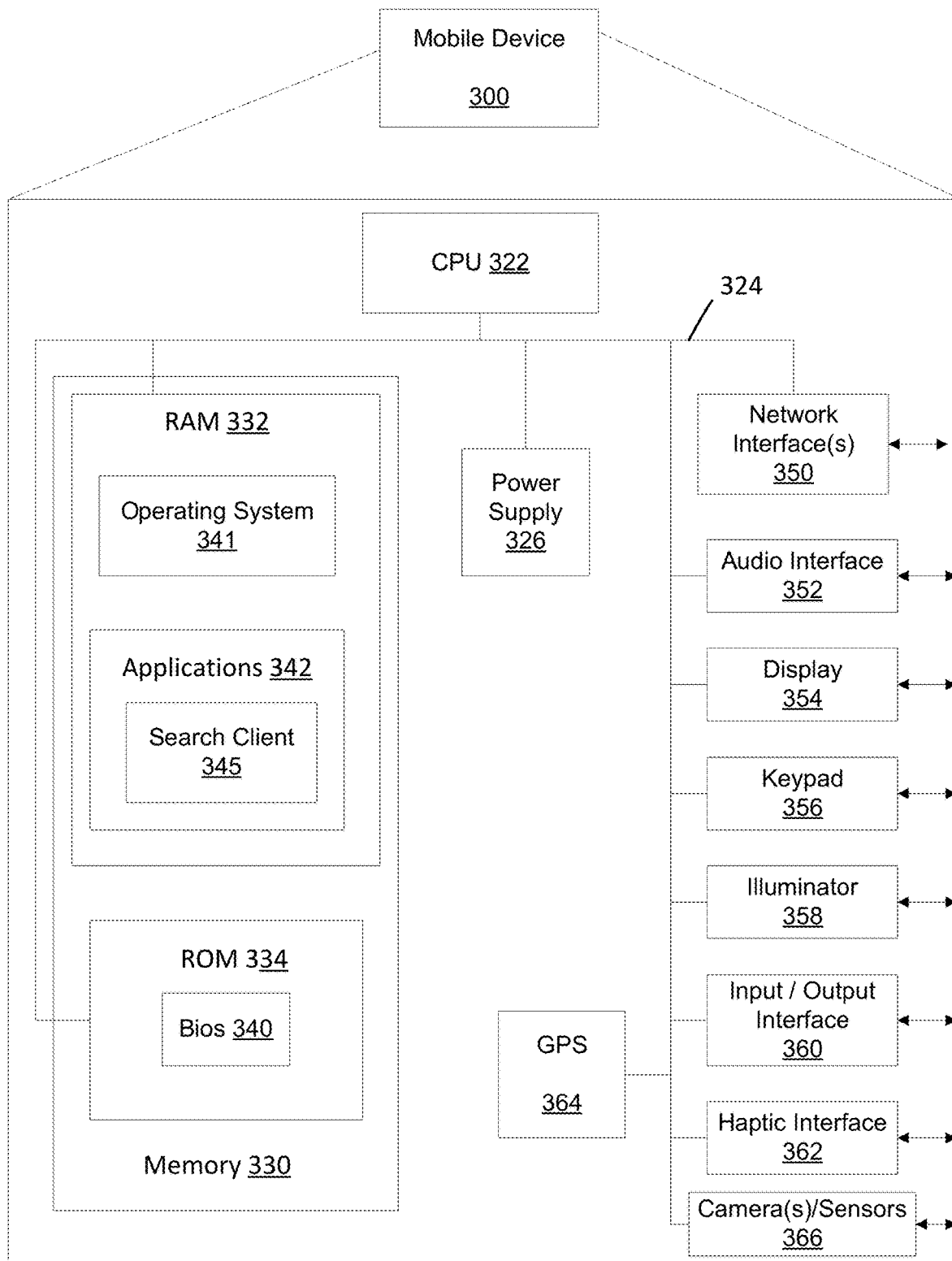
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
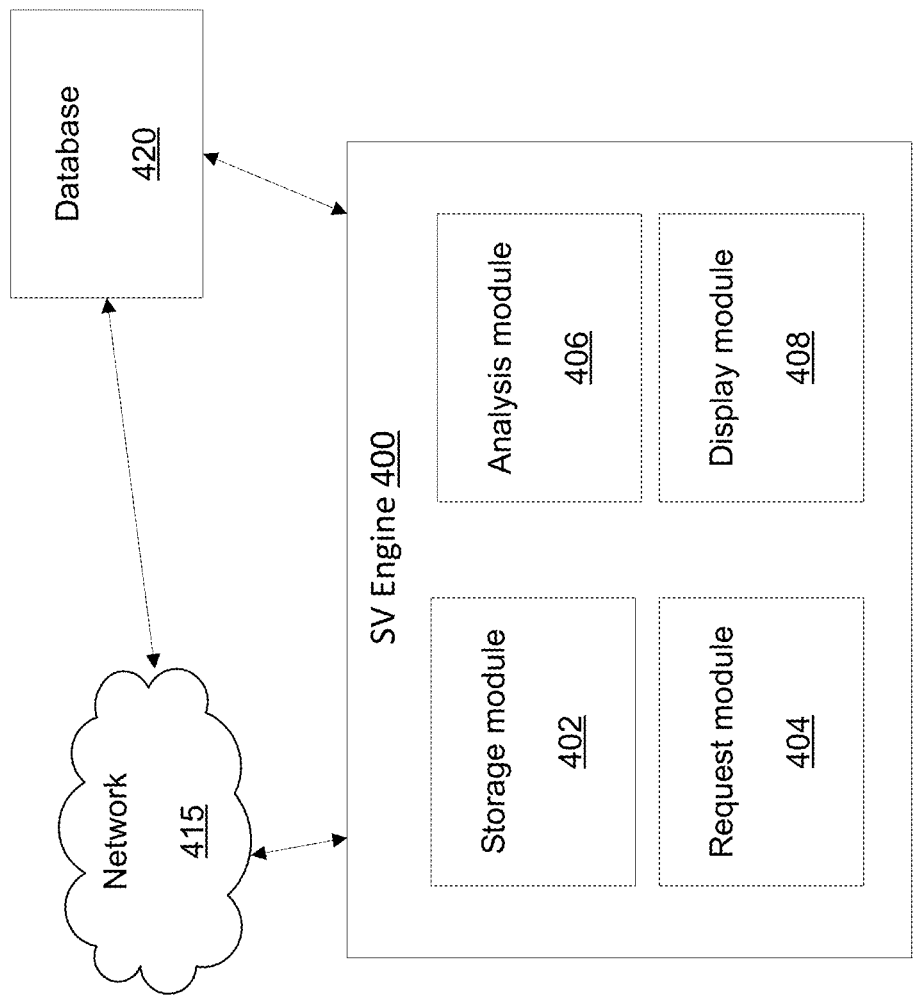
FIG. 4 is a block diagram illustrating components of an exemplary system in accordance with some embodiments of the present disclosure.

FIG. 4 is a block diagram illustrating the components of some embodiments. FIG. 4 includes storage and visualization (SV) engine 400, network 415 and database 420. The SV engine 400 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, SV engine 400 can be embodied as a stand-alone application that executes on a server and/or user device (e.g., on a cloud server and/or on-prem on a user device or local storage). In some embodiments, the SV engine 400 can function as an application installed on a device; and, in some embodiments, such application can be a web-based application accessed by a device over a network. In some embodiments, engine 400 can be configured as a script or extension that enhances how another application or device operates (for example, an XR script that improves and provides non-native functionality to XR applications and hardware on a iPhone® or Samsung® wearable, and the like).

The database 420 can be any type of database or memory, and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, operations, tasks, assets, files, projects, versions, synchronization events, schedules, images, videos, text, messages, products, items and services from an assortment of media and/or service providers and/or platforms, and the like.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include user device information, including, but not limited to, device identifying information, device capability information, voice/data carrier information, applications installed or capable of being installed or executed on such device, and/or any, or some combination thereof. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the SV engine 400, and the database of stored resources 420. Indeed, as illustrated in FIG. 4, the SV engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as SV engine 400, and includes storage module 402, request module 404, analysis module 406 and display module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 5:
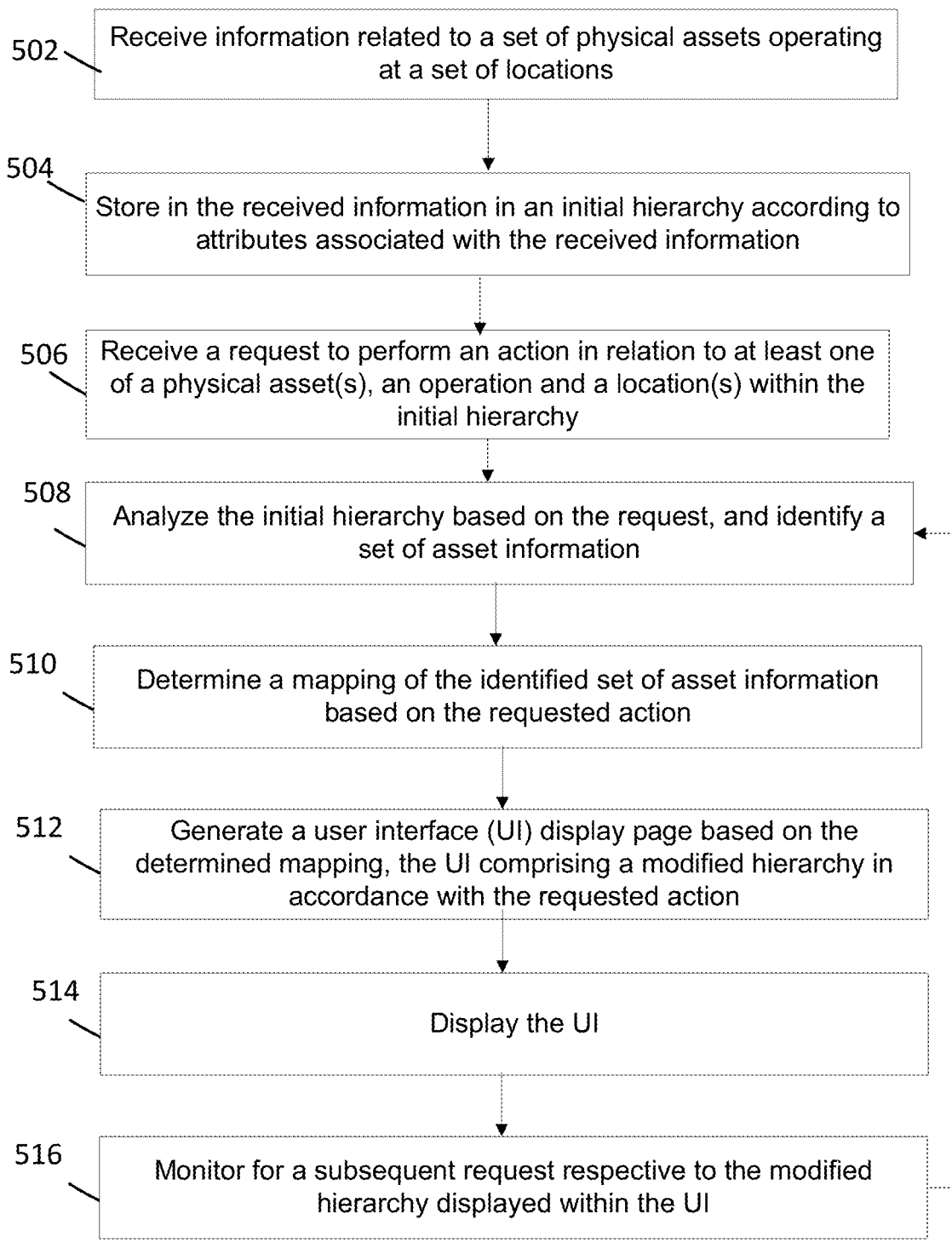
FIG. 5 details a non-limiting data flow according to some embodiments of the present disclosure.

Turning now to FIG. 5, non-limiting embodiments are discussed that detail how the disclosed framework enables multiple, alternate hierarchies to be organized, restructured and/or created based on the same set of assets, with each of the hierarchies being ontologically different and catering to wide variety of relationships that can exist between assets. The framework configures and displays a hierarchical representation of assets, along with various properties of each asset, within a dynamically generated and displayed interface. The framework's visualization and analysis can be modified in response to a request, where dependent on the type of request or type of action included in the request, a restructuring of a hierarchy or new generation of a hierarchy can be realized and displayed.

According to some embodiments of Process 500, Steps 502-504 are performed by storage module 402 of SV engine 400; Steps 506 and 516 are performed by request module 404; Steps 508-510 are performed by analysis module 406; Steps 512-514 are performed by display module 408.

Process 500 begins with Step 502 where information related to a set of assets operating at a set of locations is received. The information can correspond to the data from the assets' operation for a time period. The assets, as understood by those of skill in the art, can be physical assets or digital assets (e.g., computer programs executing on a physical tool that drives how the tool operates). The asset information can include, but are not limited to, the location of the asset, time or schedule of operation, types of tasks performed during operation, alarms, anomalies and the like, or some combination thereof.

In some embodiments, the asset information received in Step 502 can be pre-structured such that the relationship to other assets, locations, operations or behaviors can be predefined prior to transmittal to a cloud server. In some embodiments, Step 502 can involve parsing the asset information upon receipt, then identifying and extracting information related to the structuring therefrom.

In some embodiments, the asset information may not be pre-structured. Therefore, in Step 502, engine 400 can receive and analyze the data and metadata included in the asset information for each asset and determine how they relate to each other. This relationship, as discussed herein, can dictate how the asset information for each asset, location and operation is at least initially stored and linked to other assets, locations and operations, and/or hierarchies.

According to some embodiments, such analysis and structuring can be performed by any type of known or to be known computational analysis technique, including but not limited to, vector analysis, data mining, computer vision, machine learning, neural network, artificial intelligence, and the like, or some combination thereof.

In Step 504, the asset information is stored in a database according to a hierarchy that is indicated from Step 502, as discussed above. The storage can be in any type of electronic, local or network based data storage, which can include, but is not limited to, blockchains, unordered, ordered, heap files, hashes, tree structures, object-oriented, column or row orientated, graph, NoSQL, NewSQL, cloud and the like.

Figure 6:
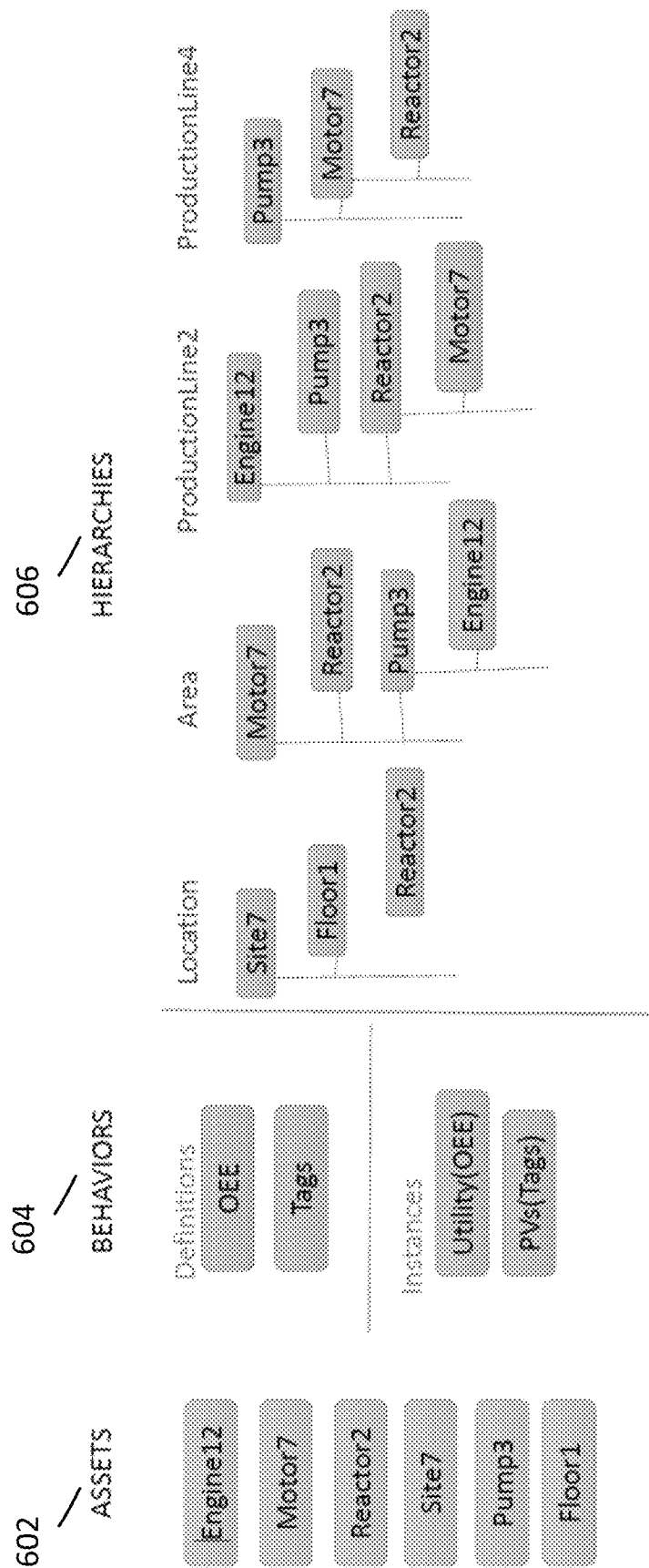
FIG. 6 illustrates non-limiting example embodiments according to some embodiments of the present disclosure.

By way of a non-limiting example, turning to environment 600 of FIG. 6, asset information related to a set of assets 602 and their behaviors 604 (at a location) are received. Step 502. As a result of Step 504, they are stored in a set of hierarchies 606. Discussion of FIG. 6 will be detailed further below.

Turning back to FIG. 5, Process 500 continues with Step 506 where a request to perform an action in relation to at least one of a physical asset, operation (or behavior) and/or a location within the stored hierarchy is received.

In some embodiments, the request can be received from a user. In some embodiments, the request can be received from an application or device, and in some embodiments, such requests can be automatically generated and communicated to engine 400.

In some embodiments, the requests can be generated based on a criteria including, but not limited to, alarm information, anomaly information, a time, location, type of asset, type of user, type of operation, context, application capabilities, device capabilities, and the like, or some combination thereof.

In some embodiments, the action identified by the request can be, but is not limited to, a request to view the hierarchy, to restructure the hierarchy, the create a new hierarchy, and the like or some combination thereof.

For example, as illustrated in system 700 of FIG. 7, item 708 illustrates "Actions" that are requested to be taken, and are acted upon (as discussed below) of assets 702, their behaviors 704 and the subsequent hierarchy 706 that is updated/created from such respective Action 708.

In some embodiments, the type of restructuring or creation of a hierarchy can be based on information related to a user, a device or an application, or an asset or other form of asset information. For example, an application is interested in determining and reporting certain types of alarms of a specific machine operating at particular locations. This request can be relayed via Step 506 where the requested information can be a search query that is input as a search request to the initially stored hierarchy. As discussed below, the hierarchy can be restructured or a new hierarchy can be created that addresses the search for the specific information.

In Step 508, the initial hierarchy (from Step 504) is analyzed based on the request (from Step 506), and a set of asset information is identified. The set of asset information corresponds to a path representing a relationship of assets and asset data and metadata that corresponds to the requested action or requested information (from step 506).

According to some embodiments, the analysis performed in Step 508 can be performed via any type of known or to be known computational analysis technique, including but not limited to, vector analysis, data mining, computer vision, machine learning, neural network, artificial intelligence, and the like, or some combination thereof.

As a result of Step 508's analysis, engine 400 determines a mapping of the identified set of asset information. Step 510. The determined mapping corresponds to a new structure of the initial hierarchy. In some embodiments, the mapping defines a new path between the stored information within storage. In some embodiments, as discussed above, this can be a restructuring, which will result in the storage being updated to reflect the updated hierarchical structure and data stored therein. In some embodiments, as discussed above, this can involve creating a new hierarchy, which will result in the storage being updated to include the newly created hierarchical structure and data stored therein.

As discussed above, hierarchies can be independent of each other, and not all assets in one hierarchy need to be in another.

For example, as illustrated in FIG. 6, each hierarchy: "location" "area" "productionline2" and "productionline4" correspond to at least operation of "reactor 2"; however, as evident from each hierarchy, the assets included therein are not the same for any of structure. Thus, as evident from the disclosure herein, particular hierarchies can be selected for particular tasks when requesting information related to particular types of information related to "reactor2"—for example, using "location" hierarchy when desiring information about the reactor, but using "area" hierarchy when requesting information about the reactor's "engine12".

In Step 512, as a result of the determined mapping from Step 510, a user interface (UI) display page is generated. In Step 514 the UI is displayed on and/or caused to be displayed (e.g., via a communication over a network to) a device for display.

The UI provides a display of the modified hierarchy that is a product of the determined mapping of Step 510. The UI page is configured for rendering in any type of computing environment, including, but not limited to, an application, browser, web page, web site, extended reality (XR) display (which includes augmented, virtual and/or mixed reality imagery), and the like. The UI can include any type of digital content, such as, but not limited to, an interface object, hyperlink, text, graphics, video, multimedia, audio, images, and the like, or some combination thereof.

Thus, according to some embodiments, the displayed UI from Steps 512-514 provides a visualization of a structured path between assets and their associated information. This can visibly display, for example, alarm information for a set of alarms, that provides an inter-relationship between the assets which can further provide an indication as to why certain alarms are occurring (e.g., they share a similar behavior 604/704 within the hierarchies which can indicate that that behavior is tripping the system and thereby causing an alarm, for example).

Additionally, the displayed UI can enable control of at least a portion or all of the assets, either individually or in combination via interaction with the displayed information. For example, if a user selects an interface object associated with a hierarchy or a parent to a child within the hierarchy, the object can act as a linking URL over a network which can enable the user to control or at least view asset data related to the selected asset, its children (as per the hierarchy) or the entire hierarchy of assets, as discussed herein.

Process 500 continues to Step 516 where engine 400 further monitors for subsequent (or follow-up) requests respective to the displayed hierarchy within the UI. Upon detection, Process 500 recursively reverts to Step 508, where additional analysis is performed on the hierarchy (e.g., the hierarchy displayed within the UI) based on the action and information within the subsequently received input. Such analysis and processing are performed in a similar manner as discussed above in relation to Steps 508-514.

Turning to FIGS. 6 and 7, systems 600 and 700, respectively, illustrate non-limiting example embodiments of a common intelligent modelling of how asset information (e.g., data related to assets 602/702 and behaviors 604/704) can be leveraged into modified hierarchies (606/706). According to some embodiments, systems 600 and 700 can support multiple hierarchies 606/706. In some embodiments, assets 602/702 must be created before added to a hierarchy 606/706.

In some embodiments, as illustrated in FIG. 6, assets 602 can comprise engine12, motor7, reactor2, site7, pump3, and floor1. In some embodiments, behaviors 604 can comprise definitions and instances. In some embodiments, behaviors 604 can include definitions and instances. In some embodiments, definitions can include, but are not limited to, OEE and tags. In some embodiments, instances can include, but are not limited to, Utility (OEE) and PVs (tags).

In some embodiments, according to the discussion above in relation to Process 500 and the assets 602 and behaviors 604, hierarchies 606 can comprise location, area, productionline2, and productionline4, for example. For example, in some embodiments, location hierarchy can comprise site7, floor1, and reactor2. In another example, in some embodiments, area hierarchy can comprise motor7, reactor2, pump3, and engine12. In another example, in some embodiments, productionline2 hierarchy can comprise engine12, pump3, reactor2, and motor7. And, in yet another example, in some embodiments, productionline4 hierarchy can comprise pump3, motor7, and reactor2.

In some embodiments, assets can be created and renamed. In some embodiments, renaming can be reflected in all hierarchies, or a portion of all hierarchies. In some embodiments, assets can be deleted if there are no dependencies and/or if the dependencies are not in any hierarchy. Some embodiments include post assets. In some embodiments, a new asset can be created independent of hierarchy. Some embodiments include post hierarchy. In some embodiments, a new hierarchy can be created without the addition of an asset. Some embodiments include post AssetInHierarchy, i.e. (assetName, hierarchyName). In some embodiments, AssetInHierarchy can add existing assets in an existing hierarchy. In some embodiments, location of an asset in a hierarchy can be automatically or manually based on the path in assetName.

In some embodiments, behaviors attached to assets can be independent of hierarchies. In some embodiments, a hierarchy can be independent of another. In some embodiments, not all assets need to be in a hierarchy. In some embodiments, changing a hierarchical relationship in a hierarchy can move children along. In some embodiments, a remove function does not remove an asset from a hierarchy if there are children, unless the removal involves cascade deletion. In some embodiments, children can be attached to a parent of an asset being removed from hierarchy.

Turning now to FIG. 7, system 700 illustrates how Actions 708 (e.g., requests from Step 506) can impact assets 702, behaviors 704 and hierarchies 706.

For example, in some embodiments, a behavior utility can be created, for example, behavior utility can be a type of OEE for Asset Motor7. In another example, in some embodiments, an asset can be created for ProductionLine4, for example, the asset can be Motor7 and ProductionLine4 with the behavior being Utility (OEE). In another example, in some embodiments, a hierarchy can be a location, for example, the asset can be Motor7 and ProductionLine4, with a behavior of Utility (OEE), and a hierarchy of a location.

In another example, in some embodiments, an asset can be added to a hierarchy, for example, assets Motor7 and ProductionLine4 can have a behavior of Utility (OEE), with a hierarchy of Location and ProductionLine4. Additional examples are: assets Motor7 and ProductionLine4 can have a behavior of Utility (OEE), along with hierarchies Location, ProductionLine4 and ProductionLine4 with ProductionLine4 and Motor7. In another example, in some embodiments, asset Motor7/Engine12 can be added to hierarchy ProductionLine4. And, in another example, in some embodiments, an error return if there is no asset for Engine12.

Thus, as discussed above, systems 600 and 700 of FIGS. 6 and 7, respectively, illustrate non-limiting example embodiments of a common intelligent modelling of how asset information (e.g., data related to assets 602/702 and behaviors 604/704) can be leveraged into modified hierarchies (606/706) based on an example set of actions (708 of FIG. 7).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system for generating a new structure of from an initial hierarchy comprising:
   at least one computer comprising at least one processor and at least one non-transitory computer readable medium, the at least one non-transitory computer readable medium including instructions stored thereon that when executed cause the at least one computer to:
   display, by the at least one processor, an initial hierarchy comprising a hierarchical representation of a first set of relationships existing between assets;
   receive, by the at least one processor, a search request from a user for information within the initial hierarchy;
   identify, by the at least one processor, a set of asset information by analyzing—the initial hierarchy based on the search request, the set of asset information including identified assets, a relationship of the identified assets, data corresponding to the identified assets, and metadata corresponding to the identified assets;
   execute, by the at least one processor, a creation of a new hierarchy by determining a mapping of the identified assets as identified by the set of asset information in response to the search request, the new hierarchy being ontologically different than the initial hierarchy; and
   generate, by the at least one processor, a display of the new hierarchy that provides a visualization of a structured path between the assets and their associated information in response to the received search request.

2. The system of claim 1,
wherein the system enables multiple, alternate hierarchies to organize a same set of assets rather than being tied to a relationship of a parent and child relationship.

3. The system of claim 1,
wherein the system is configured to enable a platform hosting the system is to request a hierarchy be reorganized, restructured, or created according to the platform's computing capabilities.

4. The system of claim 1,
wherein the system is configured to generate one or more alternate hierarchies to organize a same set of assets rather than being tied to a relationship of a parent and child relationship.

5. The system of claim 1,
the at least one non-transitory computer readable medium including further instructions stored thereon that when executed cause the at least one computer to:
   identify, by the at least one processor, a set of assets based on the search request;
   determine, by the at least one processor, a mapping of the identified set of assets based on the search request; and
   execute, by the at least one processor, a creation of an alternate hierarchy that provides a visualization of a new structured path between the set of assets.

6. The system of claim 1,
wherein the visualization comprises an automatic grouping of alarms of an asset.

7. A system for generating a modified hierarchy from an initial hierarchy comprising:
   at least one computer comprising at least one processor and at least one non-transitory computer readable medium, the at least one non-transitory computer readable medium including instructions stored thereon that when executed cause the at least one computer to:
   display, by the at least one processor, an initial hierarchy comprising a representation of a first set of relationships existing between assets;
   receive, by the at least one processor, a request to perform an action within the initial hierarchy;

analyze, by the at least one processor, the initial hierarchy based on the request and identify a set of asset information;

identify, by the at least one processor, a set of asset information by analyzing the initial hierarchy based on the request, the set of asset information including identified assets, a path representing a relationship of the identified assets, data corresponding to the identified assets, and metadata corresponding to the identified assets;

generating a modified hierarchy representing a second set of relationships existing between the identified assets as identified by the set of asset information by determining a mapping of the identified set of asset information in response to the request to perform the action, the modified hierarchy being ontologically different than the initial hierarchy; and generate, by the at least one processor, a user interface based on the determined mapping, the user interface comprising the modified hierarchy.

8. The system of claim 7, the at least one non-transitory computer readable medium including further instructions stored thereon that when executed cause the at least one computer to:

monitor, by the at least one processor, a subsequent request respective to the modified hierarchy displayed with the user interface;

analyze, by the at least one processor, the modified hierarchy based on the request and identify a modified hierarchy set of asset information;

determine, by the at least one processor, a modified hierarchy mapping of the identified modified hierarchy set of information based on the requested action; and generate, by the at least one processor, a new user interface based on the determined modified hierarchy mapping;

wherein the new user interface comprises a new modified hierarchy in accordance with the subsequent request to perform the action.

9. The system of claim 8, wherein the modified hierarchies and the new modified hierarchy each include an organization of the set of assets, with each of the modified hierarchies and the new modified hierarchy being ontologically different.

10. The system of claim 7, wherein the system is configured to enable a platform hosting the system is to request a hierarchy be reorganized, restructured, or created according to the platform's computing capabilities.

11. The system of claim 7, wherein the requested action includes a relation to at least one of a physical asset, an operation, and a location within the initial hierarchy.

12. The system of claim 7, wherein the system is configured to generate one or more alternate hierarchies to organize a same set of assets rather than being tied to a relationship of a parent and child relationship.

13. A system for generating a new structure of an initial hierarchy comprising:

at least one computer comprising at least one processor and at least one non-transitory computer readable medium, the at least one non-transitory computer readable medium including instructions stored thereon that when executed cause the at least one computer to:

receive, by the at least one processor, initial information related to a set of physical assets;

store, by the at least one processor, the received initial information in an initial hierarchy according to attributes associated with the received initial information, the initial hierarchy representing a first set of relationships existing between the set of physical assets;

receive, by the at least one processor, a search request from a user for specific information within the initial hierarchy;

analyze, by the at least one processor, the initial hierarchy based on the search request;

identify, by the at least one processor, a set of assets based on the search request;

determine, by the at least one processor, a mapping of the set of assets that corresponds to a new path between the set of assets and the stored received initial information, the mapping being based on relationships between the set of assets, data corresponding to the set of assets, and metadata corresponding to the set of assets; and execute, by the at least one processor, a creation of an alternate hierarchy that represents a second set of relationships existing between the set of assets, the alternate hierarchy providing a visualization of the new path between the set of assets and the received stored initial information in response to the search request, the alternate hierarchy being ontologically different than the initial hierarchy.

14. The system of claim 13, wherein the visualization comprises an automatic grouping of alarms of an asset.

15. The system of claim 14, wherein the visualization includes alarm information for a set of alarms; and wherein the visualization provides an inter-relationship between the set of physical assets which provide an indication as to why the set of alarms are occurring.

16. The system of claim 13, the at least one non-transitory computer readable medium including instructions stored thereon that when executed cause the at least one computer to:

modify, by the at least one processor, the visualization in response to a new request.

17. The system of claim 16, wherein dependent on a request type or action type included in the new request, a restructuring of the alternate hierarchy or generation of a new hierarchy is displayed.

18. The system of claim 17, wherein the system is configured to enable a platform hosting the system is to request a hierarchy be reorganized, restructured, or created according to the platform's computing capabilities.

* * * * *